(No Model.)

2 Sheets—Sheet 1.

C. W. McLEAN.
MANUFACTURE OF ANNEALED AND TOUGHENED GLASS SLABS.

No. 253,541. Patented Feb. 14, 1882.

WITNESSES

INVENTOR (No Model.) 2 Sheets—Sheet 2.

C. W. McLEAN.
MANUFACTURE OF ANNEALED AND TOUGHENED GLASS SLABS.

No. 253,541. Patented Feb. 14, 1882.

WITNESSES
T. C. Brecht
E. A. Dick

INVENTOR
C. W. McLean
by W. Bailey
Attorney

UNITED STATES PATENT OFFICE.

CHRISTOPHER W. McLEAN, OF NEW BERNE, NORTH CAROLINA.

MANUFACTURE OF ANNEALED AND TOUGHENED GLASS SLABS.

SPECIFICATION forming part of Letters Patent No. 253,541, dated February 14, 1882.

Application filed October 13, 1881. (No model.)

*To all whom it may concern:*

Be it known that I, CHRISTOPHER W. MC-LEAN, of New Berne, North Carolina, have invented certain new and useful Improvements in the Manufacture of Annealed and Toughened Glass Slabs, of which the following is a specification.

My invention consists in the manufacture of an all-glass slab adapted for use as a top for tables and like articles of furniture. This slab is, by the means hereinafter described, molded or formed in a mold of the shape required for the finished article, and is while in the mold annealed or tempered and toughened, so as to be fully adapted, when removed from the mold, to be used as a table or furniture top. For the purpose of thus annealing and toughening the slab I make the mold hollow, and provide for the introduction therein of heated air or other heating medium, so that all faces of the mold in contact with the glass slab may be heated to the extent desired, the heat being continued and graduated during the molding operation until the slab becomes properly annealed or tempered. In the manufacture of the article which I have in view it is essential that the article should be made tough and strong, in order that it may withstand, without breaking or chipping, the usage to which it must be subjected. I find, however, that it will not answer to anneal it in the way in which glass is ordinarily annealed—that is, by subjecting it after it is made to a second and annealing heat in an apparatus distinct from that in or by which it was made. The liability of the article under these conditions to warp and break is so great as to render the ordinary method of annealing practically unavailable, while the article is in any event imperfectly tempered and is not sufficiently toughened. I prefer, therefore, on all accounts, in making my new article of manufacture, to anneal it in the same mold in which it is formed and during the operation of molding.

Figure 1:
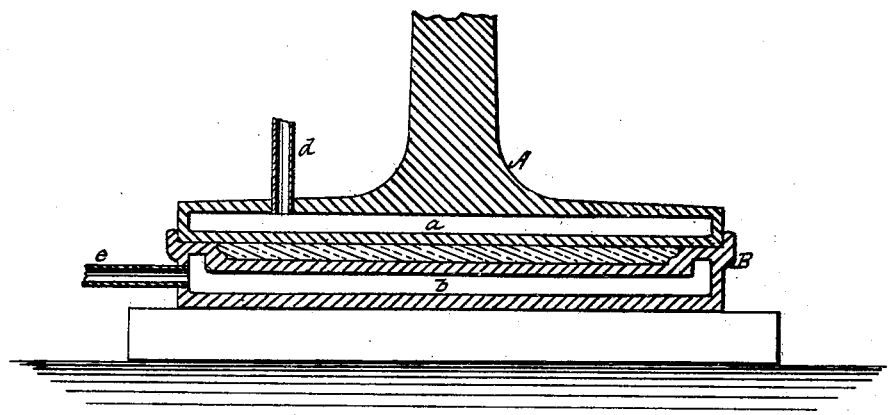
Figure 2:
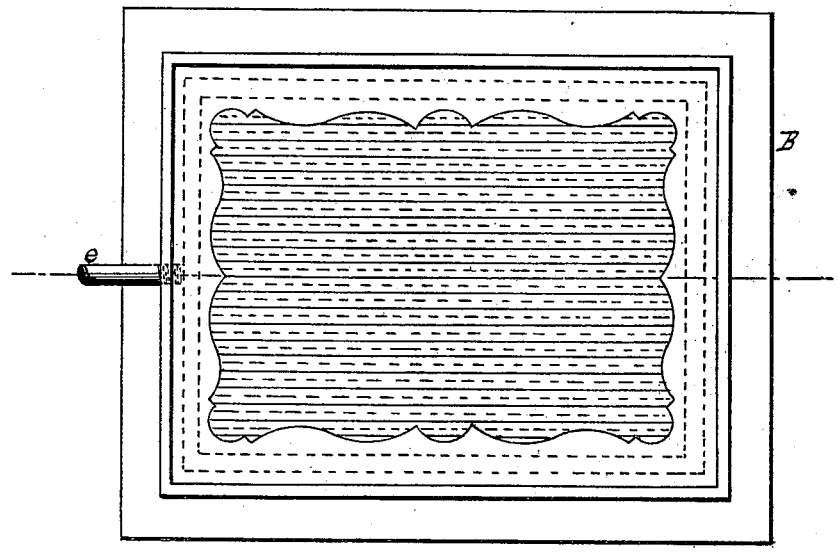

The accompanying drawings represent, in Figures 1 and 2, a mold adapted to be used for the production of my glass furniture-top slab. Fig. 1 is a vertical central section. Fig. 2 is a plan of the mold with plunger removed.

Figure 3:
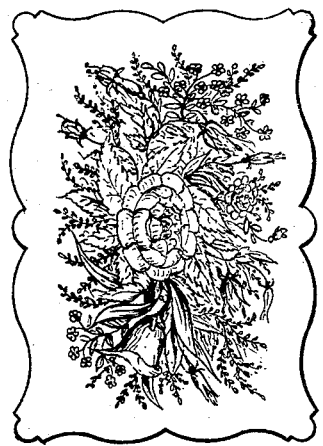
Figure 4:
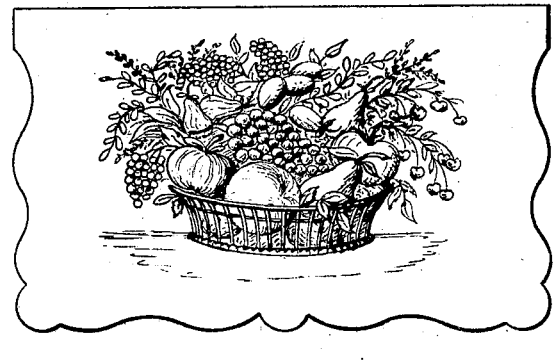
Figure 5:
Figure 6:
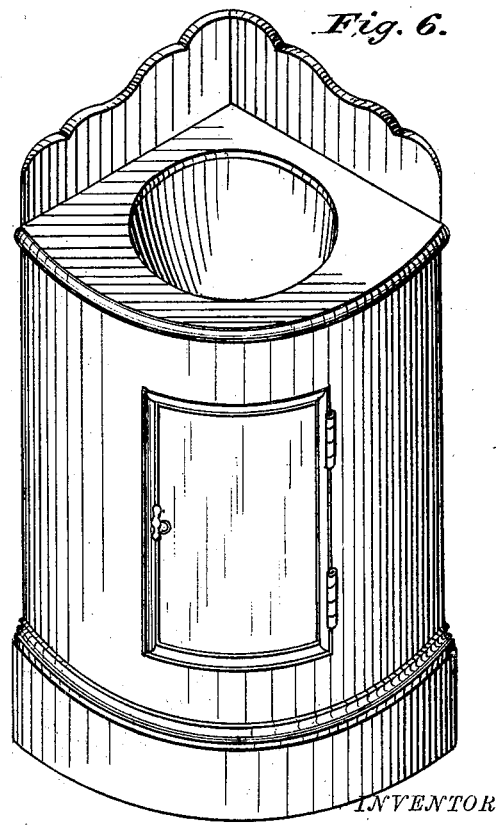

The plunger A may be formed so as to enter the mold B, as shown, or it may simply rest and fit snugly thereon, the mold being made shallow, so that the bottom of the plunger will have contact with the article formed in the mold. Both mold and plunger are made hollow, or with interior chambers, as at *a b*, for the introduction of a heating agent, so that the glass, when it is poured into the mold and the plunger brought down, will be surrounded on all sides by heated surfaces for the purposes hereinbefore stated. The mold in this instance is designed to be heated by hot air, for which purpose the chambers *a b* connect by means of suitable pipes, as at *d e*, with a source of hot-air supply, whereby the mold and plunger may be brought to and maintained at any desired degree of heat during the molding operation, and for as long a time as required to properly toughen the slab. The interior of the mold or matrix is suitably formed to produce a furniture-top of the style and shape desired, forming the same with a molded edge and impressing it with any desired ornamental design. The mold shown in the drawings produces a table-top slab, such as shown in plan and section, Fig. 3. This slab, which is thick, heavy, durable, and molded in the ultimate form desired, is made at one operation in the mold, where it is both formed into shape and annealed and toughened. In Figs. 4, 5, and 6 are shown other furniture or table tops made, in accordance with my invention, of glass slabs with molded edges and variously ornamented.

By making furniture-tops of glass I am enabled to obtain with comparative ease and cheapness ornamental effects which cannot otherwise be had. I can, for instance, in making the backs of sideboard-tops, produce in relief, if desired, representations of fruit, flowers, game, &c., by forming properly-shaped depressed designs in the mold and filling these depressions with molten glass of various colors prior to pouring in the main body or portion of the glass.

Bits of colored glass also may be arranged on the bottom of the mold in various patterns before the molten glass is poured therein, and these pieces will become embedded in and incorporated with the molten glass that forms the body of the article. I can also in the same way embed in the glass mosaic or fancy designs of any material which will not be affected by the heat of the glass.

Small threads of colored glass may be arranged in the molds to imitate marble from various quarries, in which case the body of the article should be made of milk or alabaster glass.

I do not confine myself, however, to ornamenting the furniture-top slab in the mold and during the process of making and annealing it, for I may apply to the article after it is finished any desired design in metallic colors, and fuse the same thereon, much in the same way as porcelain and pottery articles are now decorated.

I am aware that table-tops have been covered with glass, such as used ordinarily for windows and the like.

I am also aware that strips of plate-glass have been used for jewelers' shelves and the like. This, however, is not my invention. The slab made by me is, without other adjuncts, a finished table or furniture top with molded edges as thick or thicker than the marble-slab top now generally used, and annealed and toughened, so as to be malleable in some sense and free from the brittleness of ordinary glass, and thus capable of use as a furniture-top without any supporting or protecting base-plate. It possesses marked advantages over a marble top, for it is not liable to stain, and is readily kept clean and in condition, while with it ornamental effects can be produced which are not possible in the case of marble.

I remark that I may in some cases form a slab of such dimensions as to answer for two or more furniture-tops, and then subdivide the slab into furniture-tops whose cut edges can be ground and finished in any desired pattern.

What I claim, and desire to secure by Letters Patent, is—

1. As a new article of manufacture, a glass furniture-top slab possessing the properties hereinbefore set forth.

2. The method of tempering and toughening glass furniture-top slabs, which consists in subjecting the same to annealing or tempering heat in the mold in which they are formed and during the molding operation, substantially as hereinbefore set forth.

In testimony whereof I have hereunto set my hand this 13th day of October, 1881.

CHRISTOPHER W. McLEAN.

Witnesses:
E. A. DICK,
N. C. LANE.